May 21, 1968     I. H. MONKS ET AL     3,384,471
PROCESS FOR GRANULATING AMMONIUM NITRATE COMPOSITIONS
Filed Feb. 14, 1966
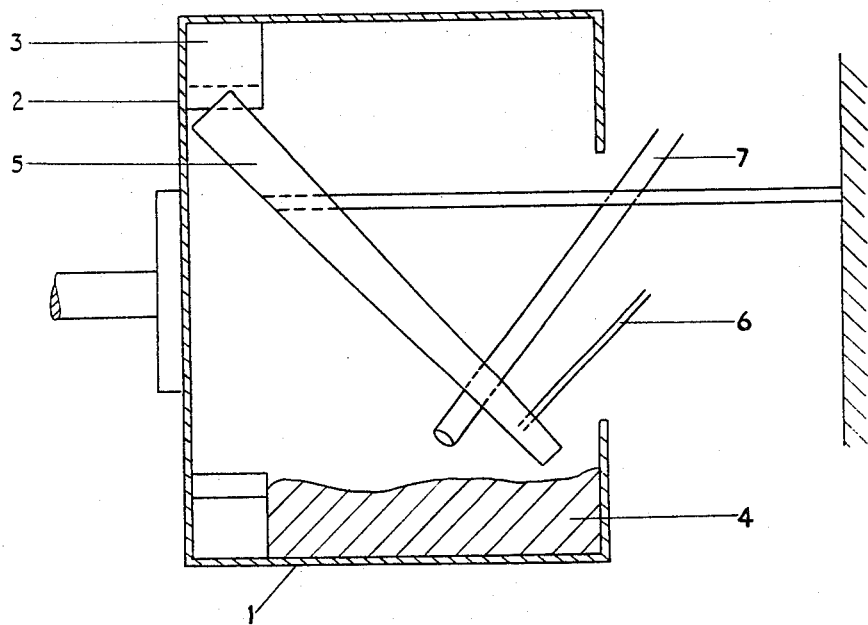
INVENTORS
IRENE HUDSON MONKS
HUBERT CHARLES OLDLAND
ROBERT STEWART STEVENSON
BY *Cushman, Darby & Cushman*
ATTORNEYS United States Patent Office 3,384,471
Patented May 21, 1968

3,384,471
PROCESS FOR GRANULATING AMMONIUM NITRATE COMPOSITIONS
Irene Hudson Monks, Alva, and Hubert Charles Oldland and Robert Stewart Stevenson, Edinburgh, Scotland, assignors to Scottish Agricultural Industries Limited, Edinburgh, Scotland, a corporation of Great Britain
Filed Feb. 14, 1966, Ser. No. 527,197
Claims priority, application Great Britain, Feb. 19, 1965, 7,283/65
8 Claims. (Cl. 71—59)

ABSTRACT OF THE DISCLOSURE

There is provided an improved process for granulating compositions containing ammonium nitrate wherein the composition is dissolved in a liquid phase, granulated and dried. The improvement comprises using as the liquid phase required for granulation a solution of ammonium nitrate in substantially anhydrous liquid ammonia and effecting the granulation under substantially anhydrous conditions. Most advantageously, the solution of ammonium nitrate contains less than 0.5% by weight of water and at least 60% by weight of ammonium nitrate. The granulation process is advantageously carried out between $-10°$ C. and $40°$ C. The composition to be granulated may also contain other materials compatible with ammonium nitrate and liquid ammonia.

The present invention relates to improvements in the granulation of ammonium nitrate or compositions comprising ammonium nitrate.

It is common practice to granulate materials, particularly fertilizers, in order to give them, for example, good handling and flow properties. Granulation is a process whereby solid particles are formed by coalescence of smaller solid particles, solidification from a melt, or drying layers of a solution or slurry successively superimposed on preformed particles. Granulation involves the presence of a liquid phase and, except in the case of melt granulation, this liquid phase, which acts as a binder, is conventionally in the form of an aqueous solution of at least one of the ingredients to be granulated. Generally it is necessary after granulation to remove most of the water of the liquid phase, in order to harden the granules and to confer on them good storage properties.

The removal of water from granules is expensive, because it generally involves the use of heat; and it is particularly difficult to dry granules which contain heat sensitive ingredients such as ammonium nitrate. We have now found that in granulation processes involving agglomeration, layering or a combination of both it is possible to provide the liquid phase required for granulation of ammonium nitrate or compositions comprising ammonium nitrate in the form of a solution of ammonium nitrate in liquid ammonia rather than as an aqueuos solution, the main advantage of our improved process being that it is easier to remove the solvent ammonia at a temperature well below that which would have to be employed if water had to be removed.

Accordingly the present invention provides a process of granulating ammonium nitrate or a composition comprising ammonium nitrate and at least one other component which is compatible with ammonium nitrate and liquid ammonia, characterized in that the liquid phase required for granulation consists essentially of a solution of ammonium nitrate in substantially anhydrous liquid ammonia and the granulation is effected under substantially anhydrous conditions.

Preferably the said solution of ammonium nitrate contains less than 0.5% by weight of water; and preferably it contains at least 60% by weight of ammonium nitrate. The solution may conveniently be added to a granulating mixture as such or in admixture with some other component, for example in the form of a slurry of ammonium nitrate in a liquid ammonia solution of ammonium nitrate. Alternatively, the solution may be formed in situ by the addition of ammonia, alone or in admixture with another component, to a granulating mixture containing ammonium nitrate.

The liquid ammonia may be removed from the granules, thereby leaving hard granules, by evaporation. The ammonia vapour so evolved may conveniently be collected and used in another process of manufacture. Sometimes atmospheric conditions are such that the temperature of the material undergoing granulation is sufficiently high to effect complete ammonia evaporation, but if desired, the granulating mass may be heated, for example by blowing heated dry air over it. Preferably the granulating mass should be maintained at a temperature greater than $-10°$ C. This is to ensure a reasonable rate of evaporation of ammonia; and, moreover, below this temperature the binding action of the liquid phase appears to be less, the ammonium nitrate separating as a fine powder rather than crystallizing to form crystal bridges binding the particles together in the granules. Preferably, granulation should be effected below $40°$ C., since above this temperature ammonia evolution is so rapid as to cause granule breakdown.

Desirably, precautions should be taken to prevent excessive ingress of damp air into the granulator, as such ingress would cause the moisture content of the granule bed to rise by condensation.

The compositions which may be granulated by the process of this invention are ammonium nitrate alone and ammonium nitrate in association with one or more other materials which are compatible with ammonium nitrate and liquid ammonia. For example, it is desirable to granulate mixtures of salts which supply the elements required in plant nutrition. Such fertilizer compositions are formulated from, for example, ammonium nitrate, ammonium phosphate and potassium chloride. We have found that a composition containing these salts can be readily granulated by a simple agglomeration technique if at least part of the ammonium nitrate is dissolved in liquid ammonia. Examples of materials which are considered incompatible are single superphosphate and triple superphosphate, two well-known fertilizer materials which supply phosphates for plant nutrition, because the ammonia present would render the phosphate insoluble and less effective as a fertilizer. This is known as $P_2O_5$ reversion.

The process of the invention is particularly applicable to layer methods of granulation as exemplified by the process which is described and claimed in British Patent No. 968,751 for the continuous production of substantially dry solid granules from a liquid composition comprising a solution of at least one of the constituents of the granules which comprises adding said liquid composition to a localized region through which a stream of solid particles is undergoing controlled internal recirculation within a substantially confined zone, wherein the temperature and concentration of said liquid composition, the temperatures of said stream of solid particles and of said confined zone, the rate of addition of said liquid composition and the rate of recirculation of said stream of solid particles through said localized region are such that the temperature and solvent content throughout the stream are sufficiently low that at least most of the individual identities of said solid particles are retained and that the temperature throughout the stream is sufficiently high that superimposed substantially solvent-free layers on said solid particles are produced, and removing from the recirculating stream a granular end product in an amount substantially equivalent to the solid content introduced by said liquid composition from a region in said confined zone remote from said localized region in the direction of flow of the stream, the rate of recirculation of the solid particles being at least twenty times the rate of removal of the granular end product.

The present invention, for example, provides an improved method of manufacturing granular ammonium nitrate using the process of British Patent No. 968,751 wherein the solution referred to in that specification is one of ammonium nitrate in liquid ammonia. The following example illustrates this embodiment of the present invention.

Example 1

Granular ammonium nitrate was made in the apparatus illustrated in the accompanying diagrammatic drawing accompanying the provisional specification, which apparatus is of the type described and claimed in British Patent No. 963,160.

30 lb. of ammonium nitrate particles (substantially 8–16 mesh B.S. sieve) were placed in a rotatable drum 1 of 2 feet diameter and 1½ feet long, closed at one end 2 and having an internal array of four lifting buckets 3, each of capacity about 1 lb., adapted to raise on rotation of the drum particles from bed 4 and to transfer them to an externally supported chute 5 within the drum and inclined in a direction down from the closed end 2 towards the open end of the drum. Into this chute ammonium nitrate dissolved in liquid ammonia was discharged from pipe 6 coming through the open end of the drum. The drum was provided with heating means in the form of a stream of hot air introduced into the drum by tube 7. The process was operated so that at the open end of the drum sufficient material was discharged intermittently to give, after screening, a granular product of size between 3 and 16 mesh B.S. sieve, at a production rate of 9 lb. per hour. The oversize particles separated on screening were crushed and returned with the undersized particles to the bed 4. The ammonia evolved was removed by a simple extraction system not shown in the diagram.

The operating conditions were as follows:

Drum rotation _____ r.p.m__ 17
Rate of particle recirculation _____lb./hr__ 1800
Concentration of ammonium nitrate solution
_____ percent__ 75
Rate of addition of ammonium nitrate solution _____ lb./hr__ 12
Temperature of ammonium nitrate solution ° C__ 1
Temperature of bed of particles _____ ° C___ −10 to +10
Temperature of air stream (incoming) ___ °C__ 122
Production rate _____ lb./hr__ 9
Product moisture (determined in a vacuum oven) _____ percent $H_2O$__ 0.76
Ratio of rate of particle recirculation to production rate _____ 200:1

It was found that harder granules were made if a small amount (about 1% on the weight of product) of magnesium oxide was added to the ammonium nitrate—liquid ammonia solution.

The main advantages of this method of manufacture of granular ammonium nitrate over the corresponding method using an aqueous solution, as described in the example of British Patent No. 968,751, are that the temperatures throughout the process are considerably lower, thus reducing the hazard of handling hot ammonium nitrate, that a dry product can be obtained without the necessity to remove water, and that the granules can be formed at near ambient temperature, thereby eliminating the possibility of physical stresses within the granules which may occur when the temperature passes through the transition points between the various crystal forms of ammonium nitrate (particularly 32° C., the transition temperature between Form III and Form IV). These advantages of our invention also apply when other granulation processes are applied to ammonium nitrate alone or mixed with other materials.

The following example illustrates the application of the invention to a simple agglomeration technique.

Example 2

A fertilizer containing 23% N, 11½% $P_2O_5$ and 11½% $K_2O$ was successfully granulated from 23 parts of fertilizer grade monoammonium phosphate (N:P atomic ratio 1.0, N content 13%, $P_2O_5$ content 51%), 19 parts of fertilizer grade potassium chloride ($K_2O$ content 60%) and 58 parts of ammonium nitrate dissolved in approximately 25 parts of liquid ammonia, all the said parts being by weight. The mass of material undergoing granulation was kept at 0° C. The N:P atomic ratio of the ammonium phosphate in the product was 1.44. The excess ammonia evolved was drawn off from the granulator.

What we claim is:

1. In a process of granulating a composition containing ammonium nitrate wherein the ammonium nitrate is dissolved in a liquid phase, granulated and dried, the improvement comprising using as the liquid phase required for granulation a solution of ammonium nitrate in liquid ammonia containing less than 0.5% of water, which solution contains at least 60% by weight of ammonium nitrate and is maintained at a temperature between −10° C. and 40° C., and effecting the granulation under substantially anhydrous conditions.

2. A process according to claim 1 in which the said solution is added as such to the composition to be granulated.

3. A process according to claim 1 in which the said solution is added to the composition to be granulated in the form of a slurry of ammonium nitrate in a liquid ammonia solution of ammonium nitrate.

4. A process according to claim 1 in which liquid ammonia is removed from the granules by evaporation and the ammonia vapour evolved is collected and used in another process of manufacture.

5. A process according to claim 1 in which the evaporation of the liquid ammonia is assisted by heating the granulating mass.

6. A process according to claim 1 in which excessive ingress of damp air into the granulator is prevented.

7. The process of claim 1 wherein the composition contains at least one component other than ammonium nitrate which is compatible with ammonium nitrate and liquid ammonia.

8. A process according to claim 7 in which the composition comprises ammonium nitrate, ammonium phosphate and potassium chloride.

References Cited

UNITED STATES PATENTS 2,710,795  6/1955  Douglas _____ 71—64

DONALL H. SYLVESTER, *Primary Examiner.*

R. BAJEFSKY, *Assistant Examiner.*